UNITED STATES PATENT OFFICE.

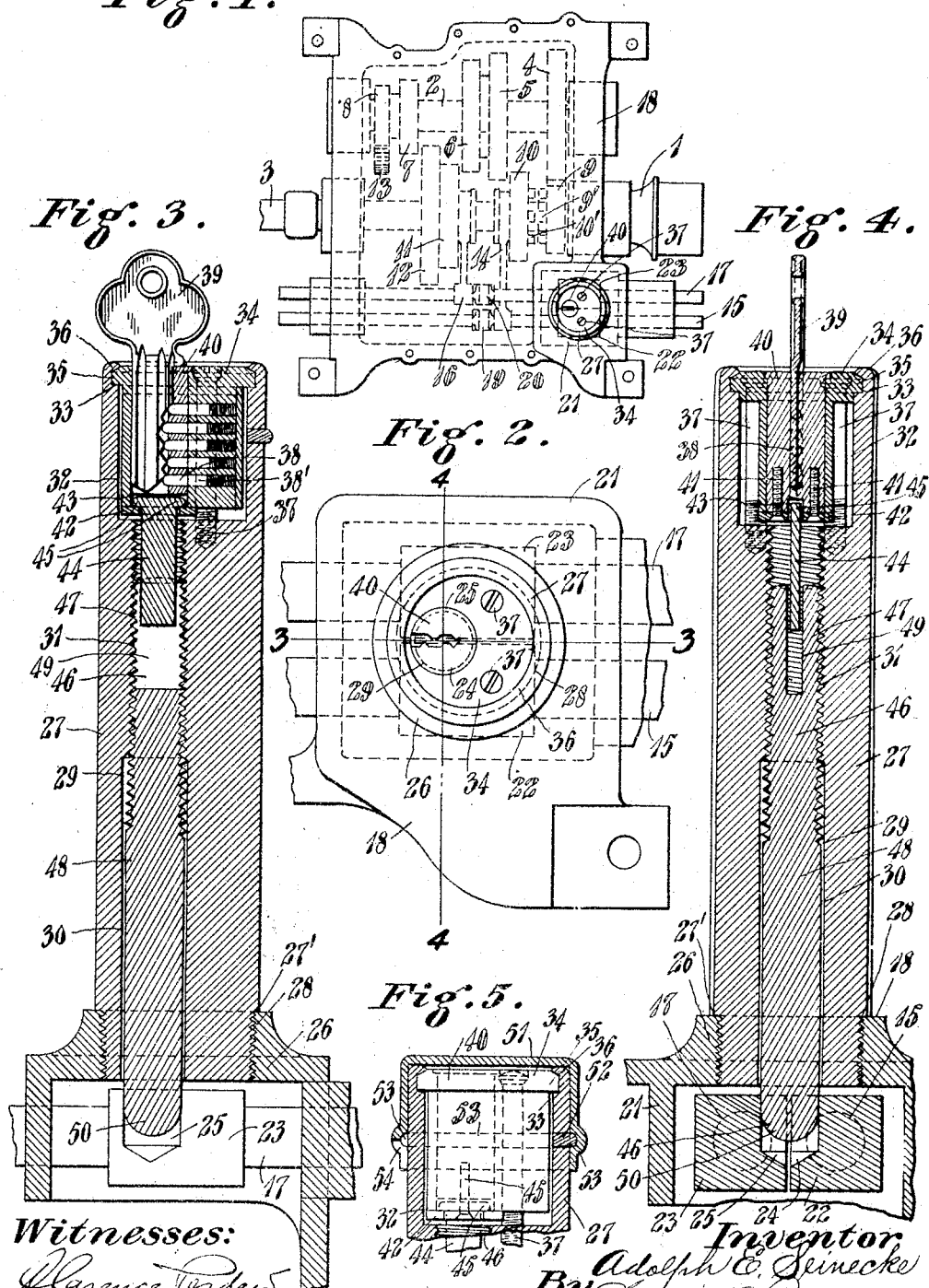

ADOLPH E. SEINECKE, OF CINCINNATI, OHIO.

AUTOMOBILE-LOCK.

1,364,955.　　　　　Specification of Letters Patent.　　Patented Jan. 11, 1921.

Application filed December 21, 1917. Serial No. 208,215.

*To all whom it may concern:*

Be it known that I, ADOLPH E. SEINECKE, a citizen of the United States, and a resident of Cincinnati, in the county of Hamilton and State of Ohio, have invented certain new and useful Improvements in Automobile-Locks, of which the following is a specification.

My invention relates to locks for vehicles, and its object is to more securely guard against theft of the vehicle.

My invention consists in the combination of parts, and in the details of construction and arrangement of parts as will hereinafter be more fully described and claimed.

In the drawing:

Figure 1 is a plan view of a motor vehicle transmission mechanism provided with my improved lock;

Fig. 2 is an enlarged plan view of part of the transmission mechanism casing and my improved lock thereon, being similar to the view in Fig. 1, but enlarged;

Fig. 3 is a vertical longitudinal section on a plane corresponding to the line 3—3 of Fig. 2;

Fig. 4 is a vertical cross section on a plane corresponding to the line 4—4 of Fig. 2; and Fig. 5 is a section similar to Fig. 3, but showing the lock casing in elevation, and showing the cap in place on the top of the device, in section.

I prefer to apply my improved lock directly to the transmission mechanism by having means engaging the shifting elements of the mechanism so as to hold them in neutral position. In the example given herein, the transmission mechanism comprises the driving shaft 1, the counter shaft 2 and driven shaft 3. It will be understood that the driving shaft 1 connects to the engine or motor of the automobile, and the driven shaft 3 connects to the wheels of the vehicle; the two shafts being in alinement but not directly connected to each other. Fixed on the counter-shaft 2 are the gears 4, 5, 6, 7 and 8; a gear 9 on the driving shaft 1 meshing with the gear 4. A gear 10 is slidably mounted on the shaft 3 to mesh with the gear 4 or to clutch with the gear 9 by means of teeth 9′ and 10′ on the gears 9 and 10, respectively. A pair of gears 11 and 12 are also slidably mounted on this shaft 3, so that the gear 11 may be meshed with the gear 6, or the gear 12 may be meshed with the gear 7, or slid farther and meshed with an idler gear 13 that meshes with the gear 8, for reversing. The shaft 3 turns with the gears 9, 12 or 13 in such direction and at such speed as may be imparted to it by meshing the respective gear with one of the counter-shaft gears, as just described.

For sliding the gear 9, there is a fork 14 fixed to a rod 15, and for sliding the gears 12 and 13 there is a fork 16 fixed to a rod 17; these rods 15 and 17 being slidably mounted in the casing 18 that surrounds and forms the support and bearing for the various shafts 1, 2 and 3; the rods 15 and 17 being parallel to the shafts. Either the rod 15 or the rod 17 is thus slid by engagement of suitable means with pairs of lugs 19 and 20 fixed on the respective rods.

This description is given merely to facilitate the explanation of my invention; it being understood that my invention is not adapted in its application peculiarly to the example shown and just described, but, as will appear hereinafter, is adapted for application to any one of various transmission mechanisms.

As here shown, the casing 18 has at one end, a lock compartment 21 with the rods 15 and 17 extending through it and having slidable bearings in its sides; and inside this compartment, fixed on the respective rods 15 and 17, are blocks 22 and 23, respectively, of such length as to permit the respective rods to slide their operative distances, and of such width as to clear the opposite sides of the compartment 21 and to have the adjacent sides of the blocks rather close together. Each of these blocks 22 and 23, has, down from its top in its side adjacent to the other block, a half cylindrical recess 24 or 25, respectively. These recesses 24 and 25 are so relatively positioned in the respective blocks that they coincide and form substantially a single cylindrical recess or socket in the two blocks when the parts are so positioned as to bring the gear 9 and the gears 12 and 13 all into unclutched or unmeshed, neutral positions. As here shown, the blocks 22 and 23 stand midway of the length of the compartment 21 under these circumstances; a movement of either rod to the left or right establishing a new speed transmitting condition of the mechanism.

As seen in Figs. 3 and 4, the top 26 of the lock compartment 21 is part of the top of the casing 18, and the blocks 22 and 23 have their tops very close to the under side of this top 26 of the compartment. The extension cylinder 27 has a threaded lower end of reduced diameter screwed into a tapped hole 28 in the top 26 of the lock compartment, so that a shoulder 27' bears on the top 26 around the hole 28 and the lower end of this cylinder 27 comes directly over the blocks 22 and 23. This cylinder 27 has a longitudinal bore 29 eccentrically located in it; the lower part 30 of the bore being of slightly greater diameter than the upper part 31, and this upper part being internally threaded, and opening, in the upper end part of the cylinder 27, into a large cylindrical recess 32 substantially concentric with the cylinder 27, and having a counter-bore adjacent to the extreme upper end of the cylinder 27, so that an annular shoulder 33 is formed a short distance down in the recess 32. A suitable cylinder lock 34 is held in the recess by having a flange 35 fitting snugly in the counter-bore and down against the shoulder 33, and preferably the upper rim 36 of the extension cylinder 27, which rim is comparatively thin around the counter-bore, is flanged down over the flange 35 all around to very securely hold the cylinder lock in the extension cylinder 27. The lock 34 is also held in place by screws 37 passing vertically down through the casing of the lock into the body of the cylinder 27 at the bottom of the recess 32.

As here shown, the cylinder lock 34 is of the well-known construction in which a plurality of pin sections 38 have alined pin sections 38' and with them are pressed by springs toward the key 39 in the cylinder 40, and the key being irregularly shaped to bring the meeting ends of the pin sections 38 and 38' all flush with the outer surface of the cylinder 40, permitting the cylinder to turn, but the cylinder at all other times being prevented from turning by the entrance of the pin sections 38' into it under the pressure of the springs 38.

On the lower end of this cylinder 40 where it is exposed at the lower end of the lock case 34 near the bottom of the recess 32, is fixed by screws 41 (Fig. 4) a slotted washer 42, having its slot alined with a transverse slot 43 in the lower end of the lock cylinder 40; thus admitting a flat bit 44 down through the slot to hang on diverging ears 45 that occupy the slot 43 in the lock cylinder 40. The parts are so arranged that this lock cylinder 40 is alined with the bore 29 when fastened in the recess 32 by the flange 36 or the screws 37, or both. It will be understood that the screws 37 will positively prevent the lock from turning in the recess and thus maintain this alinement; but if the flange 36 is very tightly compressed on the lock, the screws 37 may be dispensed with; or other fastening means may be employed within the scope of my invention.

With the lock thus having its cylinder 40 alined with the eccentrically located bore 29 in the extension cylinder 27, the bit 44 projects down into the upper part of the bore 29; and, fitting the slot of the washer 42 loosely where it passes therethrough, is capable of slight swinging movements in any direction. The bolt 46 is of elongated cylindrical formation with an upper threaded part 47 to screw up into the internally threaded upper part 31 of the bore 29, and a smooth lower part 48 to fit rather loosely in the lower part 30 of the bore 29. The upper part 47 has a transverse slot 49 into which the bit 44 projects. The slot 49 is somewhat wider than the thickness of the bit 44, so as to permit free play of the bit therein. The threaded part 47 is of such length relative to the threaded part 31 of the bore 29 that the bolt 46, by turning, may be raised in the extension cylinder 27 until its lower end part 50 lies above the plane of the tops of the blocks 22 and 23; or so that by turning in the opposite direction, this bolt 46 may project this lower end 50 into the recesses 24 and 25 of the blocks when the blocks are both brought into position with these recesses coinciding, and in the position resulting from bringing all of the gears into neutral position, as hereinbefore described. The lower end part 50 is preferably rounded, as shown. It will be understood that the threads on the lower part of the extension cylinder 27 and in the opening 28 are so positioned that when the extension cylinder 27 is entirely screwed into place, the bolt 46 will be positioned to enter the coinciding recesses 24 and 25 under the conditions just described. If, due to wear, there is not exact coincidence, the bolt may readily force the parts into proper positions by engaging its rounded end part 50 with the forward or rearward sides of the recesses 24.

I prefer to provide a cap 51 (Fig. 5) to fit snugly over the top of the extension cylinder 27 and cover the lock face; this cap being removed only when access is to be had to the lock for locking or unlocking. This cap 51 is held down by a small projection 52 in one side of the cylinder 27 which projects out into an internal annular groove 53 in the cap, there being a slot 54 from the lower rim of the cap up into this groove at one side to permit the cap 51 to be drawn off the projection 52 when the cap 51 is to register the slot 54 with the projection 52.

As shown in the drawing, the parts are in their locking positions. To unlock, the key 39 is inserted, releasing the lock cylinder 40 for turning. Then by means of the key, the lock cylinder 40 is turned continuously in the direction whereby the bolt 46 will be screwed upward by virtue of the engagement of the bit 44 in the slot 49 of the bolt. The turning is stopped when the lower end part 50 of the bolt is entirely withdrawn from the recesses 24 and 25, so as to permit either of the rods 15 and 17 to be moved to shift the gears, as desired; and when the lock cylinder 40 has been brought around to permit withdrawal of the key 39. When the vehicle is to be locked again, the key is inserted and turned in the opposite direction until the lower end part 50 of the bolt projects sufficiently into the recesses 24 and 25 to prevent all operative movement of the rods 15 and 17; and until the lock cylinder 40 has been brought around to permit withdrawal of the key again. The cap 51, when used, is very conveniently removed, as has been described; and is replaced by simply bringing it down with its slot 54 passing over the projection 52 and then giving it about half a turn.

It is within the contemplation of my invention that the locking device, substantially as just described, should be embodied in the transmission mechanism by the manufacturer of the mechanism. My improved lock is therefore preferably not an attachment, but a unitary part of the transmission mechanism. The extension cylinder 27 is long enough to project from the top of the transmission device slightly above the floor of the vehicle within convenient reach of the driver of the vehicle when seated. By having the bolt 46 eccentrically positioned in the cylinder 27, it is not only more convenient to aline it with the lock cylinder 40 of the lock 34 as such lock is manufactured; but when the device is locked it is thus impossible to unscrew the extension cylinder 27. Thus, while the major part of my improved device is readily separable from the casing of the transmission mechanism, thereby facilitating its manufacture as well as repairs thereon after in use, the security against tampering is practically as great as if the supporting structure of this major part of the locking device were integral with the casing of the transmission mechanism. Under such a condition, anyone desiring to steal or surreptitiously use the vehicle when locked by my improved device, would be unable to shift the gears into any operative position. The device could not be tampered with except by some laborious and time-consuming operation not practicable in attempting to use the vehicle under such circumstances.

By having the lock cylinder 40 operatively related to the bolt 46 merely by the bit 44 projecting loosely into the slot 47 and free to swing in any direction, there is not only saved the care that would be required to very accurately aline the lock cylinder 40 with the threaded upper part 31 of the coacting parts, but none of the vibration of the bolt 46, in its threaded mounting, is transmitted to the more delicate mechanism of the lock 34, as would be the case were the bit 44 accurately fitted to the slot 47, or were there some other operative relation between these parts, depending upon accurate alinement of the parts.

While I have thus illustrated and described in considerable detail an example of the embodiment of my invention, it will be understood that various minor modifications are possible, and, therefore, having fully described this example of my invention, what I claim as new and desire to secure by Letters Patent is:

1. An automombile lock comprising a mounting, adapted to be secured directly onto the casing of a transmission mechanism and a lock-controlled bolt movably mounted in said mounting to project therefrom and engage inside said casing with a part that is moved when the transmission mechanism has one of its gears shifted, said bolt projecting from said mounting in a position eccentric to the motion required to be given to said mounting to remove it from said casing.

2. An automobile lock comprising a mounting having a periphery at one end with a screw thread therearound to be screwed into a correspondingly threaded opening in an inclosure of an inclosed operative part by turning said mounting and lock-controlled means movably mounted in said mounting to project therefrom and engage inside said inclosure with a plurality of parts that are moved when said operative mechanism is operated, said means projecting from said mounting in a position eccentric to the turning of said mounting in screwing into said opening whereby unscrewing of said mounting from said opening is prevented when said lock-controlled means is in engagement with said part.

3. An automobile lock comprising a mounting to be screwed directly onto the casing of a transmission mechanism, and a lock-controlled bolt movably mounted in said mounting to project therefrom and engage, inside said casing, with a part that is moved when the transmission mechanism has one of its gears shifted, said bolt projecting from said mounting in a position eccentric to the motion required to be given to said mounting to screw it off said casing, for the purposes set forth.

4. An automobile lock comprising a mounting having a periphery at one end with a screw thread therearound to be screwed into a correspondingly threaded opening in an inclosure of an inclosed operative part by turning said mounting, and lock-controlled means movably mounted in said mounting to project therefrom and engage inside said inclosure with a part that is moved when said operative mechanism is operated, said means projecting from said mounting in a position eccentric to the turning of said mounting in screwing it into said opening, whereby unscrewing of said mounting from said opening is prevented when said lock-controlled means is in engagement with said part, for the purposes set forth.

ADOLPH E. SEINECKE.

Witnesses:
JAMES N. RAMSEY,
CLARENCE PERDEW.